United States Patent [19]

Brackett

[11] Patent Number: 4,838,760

[45] Date of Patent: Jun. 13, 1989

[54] FAN WITH MOTOR COOLING ENHANCEMENT

[75] Inventor: Stephen E. Brackett, Blenheim, Canada

[73] Assignee: Bendix Electronics Limited, Chatham, Canada

[21] Appl. No.: 43,276

[22] Filed: Apr. 27, 1987

[51] Int. Cl.⁴ ............................................. F04D 29/28
[52] U.S. Cl. .................... 416/93 R; 416/183; 416/187
[58] Field of Search ............. 416/93 R, 170 C, 183, 416/187, 178; 417/368; 310/62

[56] References Cited

U.S. PATENT DOCUMENTS

| | | | |
|---|---|---|---|
| 867,874 | 10/1907 | Capell | 416/183 |
| 2,106,040 | 1/1938 | Schmidt | 416/178 X |
| 2,245,989 | 6/1941 | Leathers | 417/368 |
| 2,262,695 | 11/1941 | Moeller | 416/93 R |
| 2,308,335 | 1/1943 | Mackey et al. | 416/170 C X |
| 2,406,704 | 8/1946 | Mossay et al. | 310/62 X |
| 2,488,365 | 11/1949 | Abbott et al. | 310/62 |
| 2,620,970 | 12/1952 | Palmer et al. | 416/93 R |
| 2,650,755 | 9/1953 | Woodward | 416/93 R |
| 2,781,963 | 2/1957 | Faber | 416/183 |
| 2,801,793 | 8/1957 | Kline | 416/93 R |
| 2,951,634 | 9/1960 | Koch | 416/93 R X |
| 3,303,995 | 2/1967 | Boeckel | 417/368 X |
| 3,385,516 | 5/1968 | Omottundro | 416/93 R |
| 3,449,605 | 6/1969 | Wilson | 416/93 R X |
| 4,115,030 | 9/1978 | Inagaki et al. | 416/93 R |
| 4,150,919 | 4/1979 | Matucheski | 416/93 R |
| 4,184,804 | 1/1980 | Inagaki et al. | 310/62 |
| 4,335,646 | 6/1982 | Jacquet et al. | 416/93 R X |
| 4,391,570 | 7/1983 | Stutzman | 416/93 R X |

FOREIGN PATENT DOCUMENTS

| | | | |
|---|---|---|---|
| 973853 | 6/1960 | Fed. Rep. of Germany | 416/93 R |
| 1628304 | 8/1971 | Fed. Rep. of Germany | 417/368 |
| 2809597 | 10/1979 | Fed. Rep. of Germany | 416/183 |
| 3035761 | 5/1982 | Fed. Rep. of Germany | 310/62 |
| 3514207 | 10/1986 | Fed. Rep. of Germany | 310/62 |
| 735804 | 11/1932 | France | 416/93 R |
| 153996 | 9/1982 | Japan | 416/178 |
| 1141222 | 2/1985 | U.S.S.R. | 416/178 |

Primary Examiner—Everette A. Powell, Jr.
Attorney, Agent, or Firm—Russel C. Wells; Markell Seitzman

[57] ABSTRACT

A fan (10) adapted to be driven by an electrical motor (12), the motor of the type having openings (14) to permit the flow of air therethrough to cool internal components of the motor. The fan comprising a cup-shaped hub (20) adapted to be driven by the motor and including a plurality of arcuately shaped webs (44, 70) for inducing the flow through the motor and through a plurality of openings (40) formed in a axially extending wall (28) of the hub (20).

6 Claims, 2 Drawing Sheets

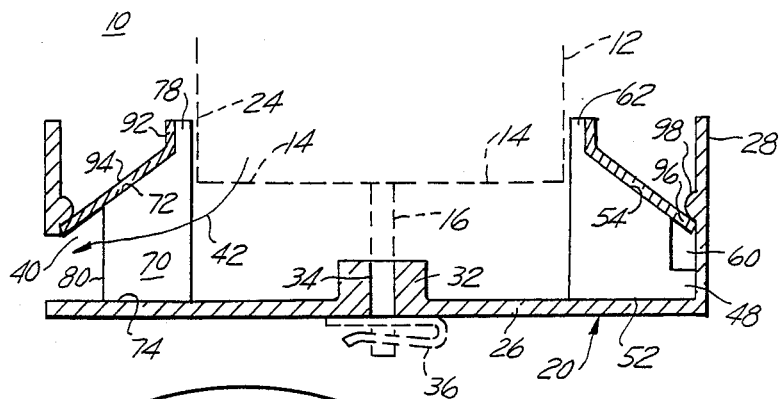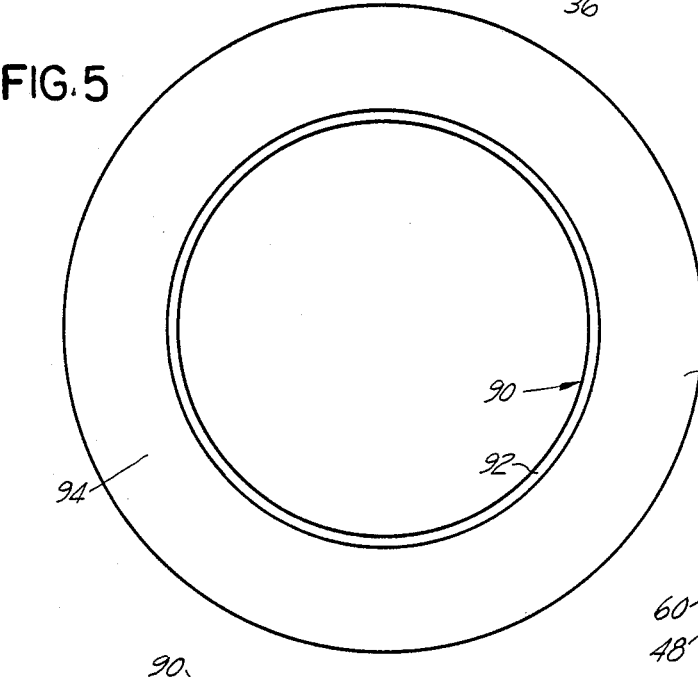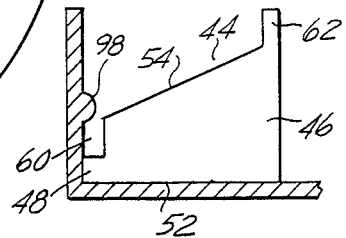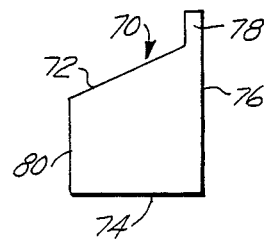

FAN WITH MOTOR COOLING ENHANCEMENT

BACKGROUND AND SUMMARY OF INVENTION

The present invention relates to an improvement in fan design and more particularly an improvement to fans which are driven by electrical motors.

Electrically driven fans for the cooling of radiators in an automotive environment are becoming common place. The ability to maintain the temperature of the motor's components within acceptable limits is significant since if the motor begins to overheat the occurrence of motor failure increases. The need to cool electrical motors has long been recognized. One means of cooling such motors has been to incorporate in its housing various openings which permit air to flow passed the internal components of the motor thereby cooling same.

It is the object of the present invention to provide an improved fan which provides for increased air flow through the electrical motor thereby reducing the internal temperature of the various motor components.

It is a further object of the present invention to include within the hub means for inducing axial air flow through a cooperating motor and to discharge same through a plurality of openings within the fan.

Accordingly the invention comprises a fan adapted to be driven by an electrical motor, the motor of a type including openings to permit air-flow therethrough to cool internal components of the motor. The fan comprising a cup-shaped hub, adapted to partially envelop an end of the motor including means for coupling to a rotating portion of the motor and means for inducing air-flow through the motor and for discharging same through at least one opening in the hub.

Many other objects and purposes of the invention will be clear from the following detailed description of the drawings.

BRIEF DESCRIPTION OF THE DRAWINGS

In the drawings:

FIG. 1 illustrates a cross-sectional view of an axial flow fan incorporating the present invention. In this FIG. an electric motor is shown in dotted line segments.

FIGS. 3 and 4 illustrate isolated plan views of various web portions shown in the prior FIGURES.

FIGS. 5 and 6 illustrate an isolated top and cross-sectional view of a cover member shown in FIG. 1.

DETAILED DESCRIPTION OF THE DRAWINGS

Figure 2:
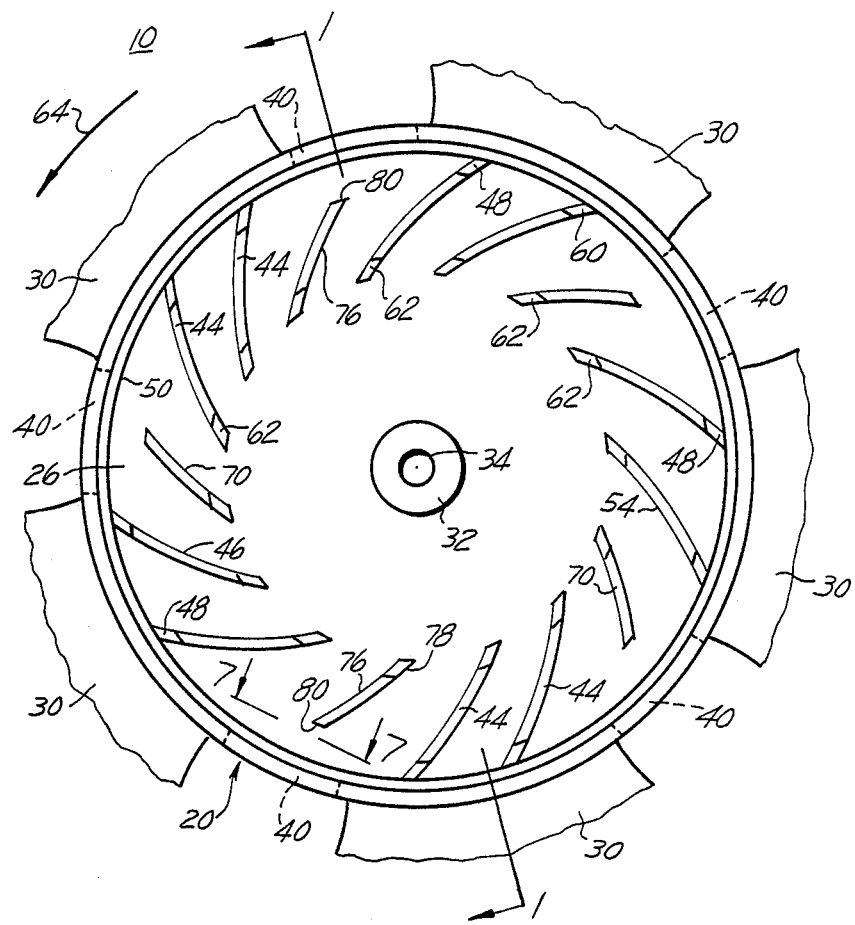
FIG. 2 illustrates a partial plan view of the fan illustrated in FIG. 1.
Figure 7:
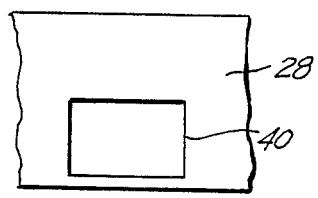
FIG. 7 is a plan view taken through section 7—7 of FIG. 2.

With reference to FIGS. 1 and 2 there is illustrated a fan generally shown as 10 adapted to be driven by an electrical motor 12, shown in dotted line. The motor of the type having cooling openings 14 and further includes a shaft 16 for rotating the fan 10. The fan 10 includes a cup-shaped hub generally designated as 20 which is adapted to envelop an end 24 of the motor. The hub includes a central member 26 and a cylindrical extending wall 28. In the embodiment of the invention illustrated in FIGS. 1 and 2 the hub comprises a portion of an axial flow fan having a plurality of fan blades 30 radially extending from the wall 28. The hub includes means for coupling to the shaft 16 such means may include an axially extending, metal reinforced boss 32 having an opening 34 therein for receiving the shaft 16 and a clip 36 for securement to an extending end of shaft 16. The cylindrical wall 28 of the hub further includes at least one opening 40. In the preferred embodiment of the invention, the hub includes a plurality of such openings between adjacent fan blade 30. One particular configuration of such openings 40 is shown in FIG. 7. The hub 20 further includes means for inducing the axial flow of air through the openings in the motor, such as opening 14 and for discharging same in a generally radial direction through the opening of 40 in the hub, such air flow being shown by arrow 42 in FIG. 1. Such inducing means includes a first plurality of arcuately shaped first webs 44. Each of such first webs extends radially inward from the hub wall 28 and is positioned about a corresponding opening 40 to induce flow from an upstream end 46 through the opening 40. More particularly, each of the first web 44 is generally radially positioned and axially extends relative to the central member of the hub 20. Each such web further includes a downstream end 48 which extends from an inner portion 50 of the wall 28 and a bottom portion 52 and top portion 54. One of such first webs 44 is illustrated in plan view in FIG. 3 as well as in FIG. 1. As illustrated in the above FIGURES, the downstream end 48 of the first web is secured to the inner portion of the wall 28 and further includes a notch 60 fabricated in the top portion, proximate the attachment to the wall 28. It is contemplated that the above-mentioned components of the fan 10 and hub 40 may be injection molded as an integral whole, however, separate fabrication and subsequent assembly is of course within the scope of the invention. As such, each bottom 52 of the webs 44 can be physically attached to the inner portion of the central member 26. As can be seen from the above the arcuately shaped webs perform at least two functions, the first being the generation of air-flow through a cooperating motor 12 and the second being a means for increasing structural rigidity or support for the hub 20. As shown in the accompanying FIGURES each top 54, is generally inclined toward the downstream end of each web 44. This configuration enhances air-flow through the hub and subsequently through the motor, however, other configurations of the top, such as a non-inclined surface, are deemed to be equivalent. Each web 44 includes a first post 62 formed as part of the upstream end 46 to provide an increased frontal area for each first web to enhance the flow of air through the hub. Each first post 62 extends above the top 54. The purpose of such extension will become clear from the discussion below below. Each of the first webs 44 are preferably arcuately shaped to achieved a curvature which is a counter to the presumed rotation (see arrow 64) of the fan.

The hub 20 further includes a second plurality of webs 70 which include an inclined top 72 which is preferably parallel to the inclination of the top 54 of the first webs 44 and a bottom 74 which is preferably attached to the central member 26, an upstream end 76 which incorporates therein another post 78 substantially identical to post 62 and a downstream end 80 which terminates proximate a corresponding opening 40. However, the downstream end 80 preferably does not extend to the wall 28 so as not to impede the flow of air through the openings 40. As can be seen in FIG. 4 the webs 70 are substantially shorter than a corresponding one of the first webs 44 and are similarly arcuately shaped to further enhance the flow of air through the hub.

To further enhance the flow of air through the hub the above-mentioned means for inducing air-flow may further include a cover 90 as shown in FIGS. 5 and 6 which are generally annularly shaped having an inner support wall 92 which transitions to an inclined conical wall 94. In operation the cover 90 is adapted to fit about the various posts 62 and 78 and the outer edge 96 of the cover is adapted to engage the inner side of the wall as shown in FIG. 1 thereby providing a means for channelling and directing air-flow through the hub. The cover 90 also enhances the structure of the hub. In order to provide for a secure fit between the cover and the various top portion 54 and 72 of the various webs 44 and 70 respectively, it is preferable that the inclination of the top portions be identical to the shape of the conical wall 94. Upon securement of the cover 90 to the various webs 44 and 70 the structural rigidity of the hub is further enhanced. FIG. 1 further illustrates one means of attaching the cover to the webs 44 and 70 wherein a curved, inwardly protruding rim 98 is fabricated about the inner portion of the wall 28. The cover is preferably formed of plastic or of a material wherein the edge 96 of the cover is flexible such that upon assembly the edge 96 may be slightly deformed so that it is retained within the hub 20 by engagement with a lower portion of a rim 98. Upon assembly the edge portion 96 may be bent within the notch 60 of each of the first webs to permit ease of attachment. The cover 90 may further be attached to each of the posts 62 and 78 by methods such as ultrasonic welding.

Many changes and modifications in the above described embodiment of the invention can, of course, be carried out without departing from the scope thereof. Accordingly, that scope is intended to be limited only by the scope of the appended claims.

I claim:

1. A fan to be driven by a motor, the motor including a cylindrical housing and openings through the housing to permit air to flow therethrough, comprising
   a hub comprising:
   an end member adapted to be driven by a motor;
   a cylindrical outer wall extending rearward of the end member to envelope an end of the motor when the hub is attached thereto;
   a plurality of circumferential openings in the outer wall;
   a plurality fan extending radially from the hub positioned about each opening;
   a first plurality of arcuate first webs extending radially inward from the outer wall and axially from the end member, each first web including an outer end contacting the end wall and an inner end, each inner end terminating at the same radial distance as measured from the center of the end member, such that when the hub is positioned upon a motor the inner ends are closely and circumferentially spaced about the motor housing wherein the height of each inner end of each first web, is greater than the height of a corresponding outer end, wherein each first web further includes an inclined surface extending from its inner end toward the outer end; and
   wherein each first web includes an elevated portion, formed as part of the inner end, axially extending beyond its corresponding inclined surface and the cover includes a support ring axially extending parallel to each elevated portion such that when the cover is seated upon the first webs the inclined surface and inclined walls mate and the inner edge of the support ring engages corresponding outer edges of each elevated portion.

2. The device as defined in claim 1 wherein the inclined surface and inclined wall are linear.

3. The device as defined in claim 1 wherein each first web, proximate the intersection of the inclined surface and outer end, includes a notch, and above the point where the inclined surface would have intersected the outer wall the outer wall includes a protruding portion, the outer perimeter of the cover comprising a flexible portion which after being flexed into the notch resiliently engages the protruding portion.

4. The device as defined in claim 3 wherein the protruding portion is formed as a protruding rim extending from the inner surface of the outer wall.

5. The device as defined in claim 1 wherein the hub further includes a second plurality of arcuately shaped second webs, each second web positioned proximate to and including an outer end spaced from one of the openings, each of the second webs extending radially outwardly from an inner end, positioned at a radial distance, towards a corresponding opening, each second web extending axially from the end member and includes an inclined surface similar to the inclined surface of the first webs.

6. The device as defined by claim 5 wherein each inner end of each second web includes an elevated portion extending above the inclined surface to receive a portion of the cover.

* * * * *